(12) United States Patent
Wu et al.

(10) Patent No.: US 8,583,201 B2
(45) Date of Patent: Nov. 12, 2013

(54) QUENCH PROTECTION CIRCUIT FOR SUPERCONDUCTING MAGNET COILS

(75) Inventors: Anbo Wu, Shanghai (CN); Minfeng Xu, Ballston Lake, NY (US); Xianrui Huang, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 119 days.

(21) Appl. No.: 13/237,805

(22) Filed: Sep. 20, 2011

(65) Prior Publication Data

US 2012/0071326 A1 Mar. 22, 2012

(30) Foreign Application Priority Data

Sep. 21, 2010 (CN) .......................... 2010 1 0298032

(51) Int. Cl.
*G01R 33/035* (2006.01)
(52) U.S. Cl.
USPC ....................................................... 505/162
(58) Field of Classification Search
USPC ................................................. 505/162, 850
See application file for complete search history.

(56) References Cited

U.S. PATENT DOCUMENTS

| | | | |
|---|---|---|---|
| 5,731,939 A | 3/1998 | Gross et al. | |
| 6,147,844 A | 11/2000 | Huang et al. | |
| 7,492,556 B2 | 2/2009 | Atkins et al. | |
| 2006/0291112 A1 | 12/2006 | Markiewicz | |
| 2009/0103217 A1 | 4/2009 | Langtry et al. | |
| 2010/0283565 A1* | 11/2010 | Blakes | 335/216 |
| 2011/0069418 A1* | 3/2011 | Huang et al. | 361/19 |

FOREIGN PATENT DOCUMENTS

| | | |
|---|---|---|
| EP | 2026083 A2 | 2/2009 |
| GB | 2448197 A | 10/2008 |
| GB | 2453836 A | 4/2009 |
| GB | 2470063 A | 11/2010 |
| GB | 2473928 A | 3/2011 |
| WO | 2007073979 A1 | 7/2007 |

OTHER PUBLICATIONS

Search Report from corresponding GB Application No. GB1116280.7 dated Jan. 20, 2012.

* cited by examiner

*Primary Examiner* — Colleen Dunn
(74) *Attorney, Agent, or Firm* — Global Patent Operation; Mark A. Conklin

(57) ABSTRACT

A superconducting magnet includes at least one superconducting coil and a quench protection circuit electrically coupled to said at least one coil in parallel. The circuit includes at least one quench heater assembly thermally coupled to the at least one coil, and at least one superconducting current limiter electrically connected in series with the at least one quench heater assembly. The superconducting current limiter has a superconducting state with zero resistance, and a normal state with a normal resistance to decrease an electric current flowing through the quench heater assembly.

17 Claims, 6 Drawing Sheets

QUENCH PROTECTION CIRCUIT FOR SUPERCONDUCTING MAGNET COILS

BACKGROUND

Embodiments of the disclosure relate generally to superconducting magnets and more particularly relates to a quench protection circuit for superconducting coils of the superconducting magnets.

In theory, superconducting magnets conduct electricity without resistance as long as the magnets are maintained at a suitably low temperature, which is referred to as "critical temperature" of the superconductor herein after. Accordingly, when a power source is initially connected to the superconducting magnet coils for a period to introduce a current flow through the magnet coils, the current will continue to flow through the coils after the superconducting switch is closed and power supply is disconnected because of the absence of electrical resistance in the coils, thereby maintaining a strong magnetic field in, for example, magnet resonance imaging (MRI) systems, and generators.

Cooling systems are used for maintaining the superconducting magnets below the critical temperature by, for example, immersing the superconducting coils in liquid helium, or by arranging other cooling apparatus such as cooling tubes thermally coupled to the superconducting coils to remove heat from the coils. A vacuum vessel and a thermal shield are provided for receiving the superconducting coils and minimize the convection and radiation heat load from ambient to the superconducting coils that should be maintained below the critical temperature. However, the magnets or part of the superconducting coils still may become normal (no longer superconducting) and develop a resistance that causes current flowing through the coils to decay rapidly converting the stored magnetic energy into Joule $I^2R$ heat that raises the temperature of the region. This is an irreversible action known as "quenching" or "quench", which causes undesirable heat that can lead to increased temperature. The entire magnet can then become normal and no longer be superconducting. In addition, quench can lead to overheating within the superconducting coil or voltage spikes and arcing damage to components as well as the magnet. It is therefore desirable that quench protection devices can quickly spread the normal zone to the other portions of the coils and dump the magnetic energy into joule heat more evenly across the entire coils or magnet. This quench protection can limit the maximum temperature and voltage in the superconducting coil to be within the safe range, prevent any coil damage caused by over-heating, over-voltage, or over-stress.

One conventional quench protection apparatus includes a set of electrical quench heaters. When a quench occurs, temperature of the heaters arises quickly, and the heaters transmit heat to a larger area of the superconducting coils. The quench protection apparatus also includes a current limiter connected in series to the heaters for limiting the current flowing through the heaters to protect the heaters from overheating. Conventional current limiters, such as positive temperature coefficient resistors, are usually arranged outside the vacuum vessel. Accordingly, there are electrical wires extending through the vacuum vessel, which requires additional cost and might adversely decrease vacuum reliability.

It is desirable to have a different superconducting magnet with a simpler quench protection circuit.

BRIEF DESCRIPTION

In accordance with an embodiment disclosed herein, a superconducting magnet is provided. The superconducting magnet includes at least one superconducting coil and a quench protection circuit electrically coupled to the at least one coil in parallel. The circuit includes at least one quench heater assembly thermally coupled to the at least one coil, and at least one superconducting current limiter electrically connected in series with the at least one quench heater assembly. The superconducting current limiter has a superconducting state with zero resistance, and a normal state with a normal resistance to decrease an electric current flowing through the quench heater assembly.

In accordance with another embodiment, a superconducting magnet system includes a thermal shield, at least one superconducting coil in the thermal shield, a vacuum vessel enclosing the thermal shield, and a quench protection circuit electrically coupled to said at least one superconducting coil in parallel. The circuit includes at least one quench heater thermally coupled to the at least one superconducting coil, and at least one superconducting current limiter connected in series with the at least one quench heater assembly. The at least current limiter includes a superconducting state with zero resistance and normal state with a finite resistance.

In according to still another embodiment, a method for quenching superconducting coils includes coupling a quench protection circuit in parallel to at least one superconducting coil. The quench protection circuit comprises at least one quench heater assembly and at least one superconducting current limiter. A quench event is triggered by an increasing quench voltage across the at least one superconducting coil. The method further includes powering the quench heater upon said quench event and normalizing the at least one superconducting coil at heater regions, and turning the superconducting current limiter from a superconducting state to a normal state to increase the resistance of the quench protection circuit heater branch and limit the current of quench heater assembly to be less than its maximum allowable current.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the disclosure relate to a superconducting magnet having a quench protection circuit. The quench protection circuit in one example comprises an electric quench heater assembly in thermal connection with a superconducting coil and a superconducting current limiter electrically connected in series with the quench heater assembly for limiting the electric current flowing through the quench heater assembly during a quench. The quench heater assembly and the superconducting current limiter are then in parallel connection with at least one superconducting coil. Once a quench event to the superconducting coil occurs, the increasing quench voltage across the superconducting coil powers the quench heater assembly, which then heats up and normalizes the superconducting coil at the quench heater regions, thereby spreading the energy and preventing damage to the superconducting magnet. As used herein "normalize" refer to that the superconductor of the coil is turned from a superconducting state to a resistive or normal state because of coil temperature exceeding the superconductor's critical temperature.

In certain embodiments, the superconducting current limiter comprises superconducting materials, and is maintained at its superconducting state during normal operation of the superconducting magnet. After the quench heater assembly has normalized the superconducting coils at the quench heater regions, and before the heater current increases to its critical current, the superconducting current limiter is turned to its normal state, and the resistance of the superconducting current limiter increases quickly to decrease the heater current. The "critical current" as used herein after refers to a maximum heater current at which the quench heater might be damaged by overcurrent or overheat. In one embodiment, the superconducting current limiter is arranged within a vacuum vessel and a thermal shield surrounding the superconducting coil. In certain embodiments, the superconducting magnets can be used in, for example but not limited to, Magnetic Resonance Imaging (MRI) systems, a power generator, and an electric motor.

Unless defined otherwise, technical and scientific terms used herein have the same meaning as is commonly understood by one of ordinary skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items, and terms such as "front", "back", "bottom", and/or "top", unless otherwise noted, are merely used for convenience of description, and are not limited to any one position or spatial orientation.

Figure 1:
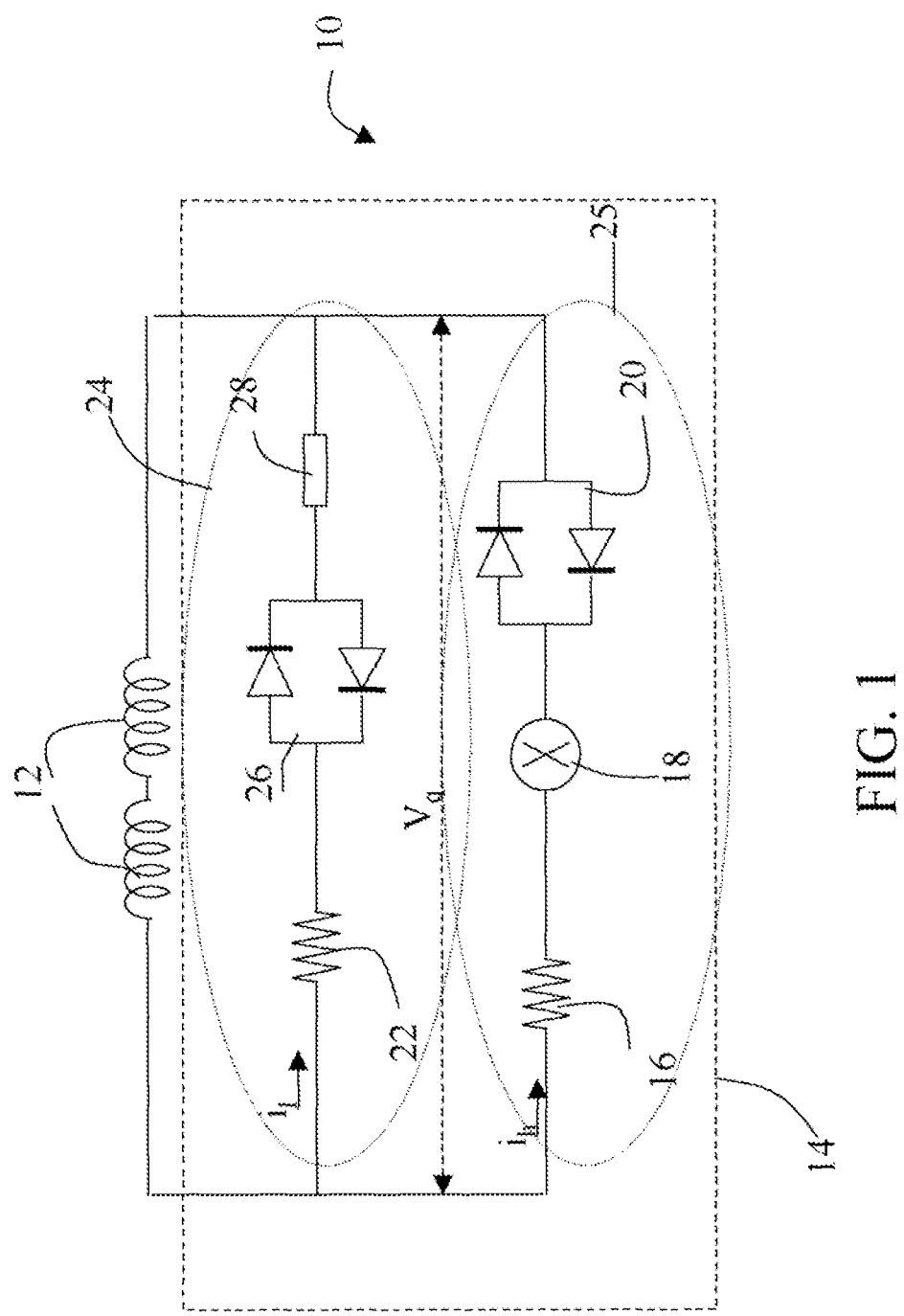
FIG. 1 is a circuit diagram of a superconducting magnet comprising a quench protection circuit according to one embodiment of the invention.

Referring to FIG. 1, a superconducting magnet 10 ("magnet 10") according to one embodiment of the invention comprises at least one superconducting coil 12 ("coil 12"), and a quench protection circuit 14 electrically coupled in parallel to the coil 12. In the illustrated embodiment, the at least one superconducting coil 12 comprises a group of superconducting coils 12 electrically connected in series. In the illustrated embodiment of FIG. 1, the quench protection circuit 14 comprises a main heating branch 25 which comprises an electric quench heater assembly 16 ("quench heater 16") which comprise a few quench heaters electrically connected in-series or in-parellel, and a superconducting current limiter 18 in series connection with the quench heater assembly 16. In certain embodiments, the quench heater assembly 16 is thermally coupled to one or more of the coils 12. In one embodiment, the quench heater assembly 16 can be glued to the coils 12 by adhesive material, such as epoxy resin, thermal grease, to form very low thermal resistances between the quench heater assembly 16 and the coils 12. In other embodiments, the quench heater assembly 16 can be mechanically attached to the coils 12 by clamping for example. Thermally coupled as used herein refers to a proximate placement allowing thermal conduction to occur.

In certain embodiments, to reduce or eliminate unwanted currents in the quench protection circuit 14 during magnet ramps and magnet normal operations, the quench protection circuit 14 further comprises a voltage blocker 20 for blocking current flowing through the quench heater 16 before the voltage of the coils 12 reaches a threshold voltage ($V_0$). In certain embodiments, the threshold voltage ($V_0$) is larger than a ramp voltage and the maximum voltages across the coils 12 during magnet normal operations and the voltage blocker 20 reduces or eliminates the unwanted current flowing in the quench protection circuit 14 or other voltage noise. In the illustrated embodiment, the voltage blocker 20 is in series connection with the quench heater 16 and the superconducting current limiter 18. In certain embodiments, the voltage blocker 20 can include a pair of back-to-back series connected components such as Zener diodes or a Metal Oxide Semiconductor Field Effect Transistor (MOSFET). The backward breakdown voltage of the Zener diodes is selected or controlled to be higher than the maximum voltages during magnet normal operations and yet low enough for the quench heater assembly 16 to act during a magnet quench.

In the normal operation of the magnet 10, the coils 12 work at a superconducting state and transmit electric current with zero resistance. The voltage across the coils 12 is zero, and no current flows through the quench heater assembly 16 during the normal operation of the magnet 10. The superconducting current limiter 18 is also at its superconducting state without any electrical current flowing therethrough. When a quench occurs to one or more of the coils 12, a quench voltage ($V_q$) across the coils 12 increases. At this state, the quench voltage ($V_q$) exceeds the threshold voltage ($V_0$) of the voltage blocker 20, and a heater current ($i_h$) flows through the quench heater assembly 16 and the superconducting current limiter 18. The quench heater assembly 16 is heated and transmits heat to one or more heater regions on the coils 12 to protect the original quench spot of the coils 12. After the coils 12 have been normalized, and before the heater current ($i_h$) reaches a critical current of the quench heater assembly 16, the superconducting current limiter 18 is turned to its normal state by the joule heating of heater 22 and the resistance of the superconducting current limiter 18 increases quickly to decrease the heater current. The quench heater 16 is thus protected from overcurrent.

Figure 2:
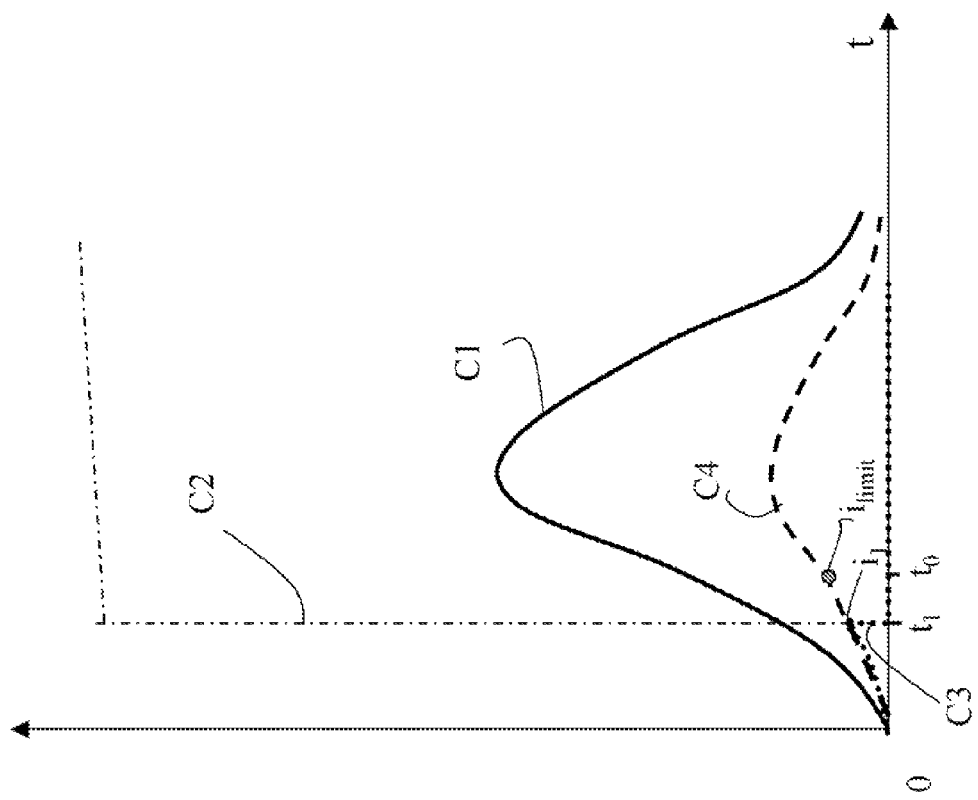
FIG. 2 illustrates several curves respectively representing resistances of a superconducting current limiter, voltage curve of a quenched coil, and current flowing through the quench heater assembly respectively with and without the superconducting current limiter within a certain time period after a quench occurs.

FIG. 2 illustrates several exemplary curves related to the time periods associated with a quench that occurs to one or more of the coils 12. Curve C1 illustrates the quench voltage ($V_q$) across the coils 12; curve C2 illustrates resistance of the superconducting current limiter 18 after the quench occurs; and curves C3 and C4 respectively illustrate the heater current with and without the superconducting current limiter. Referring again to FIG. 2, once a quench occurs to one or more of the coils 12, the increasing quench voltage across the coils 12 increases as shown by curve C1. The increasing quench voltage powers the quench heater assembly 16. Without the superconducting current limiter 18, the heater current increases along with quench voltage, shown as curve C4 in FIG. 2. If the heater current increases over the current limit ($i_{limit}$) of the quench heater assembly 16 at a critical time point ($t_0$), there is a risk that the quench heater assembly 16 will be harmed by the overcurrent and over temperature or otherwise degraded in operation or life expectancy.

With the superconducting current limiter 18 electrically coupled to the quench heater assembly 16 in series, the heater current curve is shown as curve C3. The superconducting current limiter 18 has a substantially zero resistance at the beginning of the quench event, and is turned to its normal state at a safe threshold time point ($t_1$) before the heater current reaches the current limit ($i_{limit}$) at the critical time point ($t_0$). The corresponding heater current at the safe threshold time point ($t_1$) is a safe threshold current ($i_1$). Once the superconducting current limiter 18 is turned to the normal state at the time point $t_1$, the resistance thereof increases quickly, and the heater current decreases quickly. Accordingly, the quench heater 16 is protected from overcurrent.

Referring back to FIG. 1, in the illustrated embodiment, the quench protection circuit 14 comprises a limiter heater 22 thermally coupled to the superconducting current limiter 18. The limiter heater 22 that heats the superconducting current limiter 18 to turn the superconducting current limiter 18 from the superconducting state to the normal state when the quench heater 16 has normalized the superconducting coils 12 and before the heater current $i_h$ reaches the current limit.

In the illustrated embodiment of FIG. 1, the quench protection circuit 14 comprises a limiter-heating branch 24 electrically coupled in parallel to the main heating branch 25, wherein the main heating branch 25 includes the quench heater assembly 16, the superconducting limiter 18, and the voltage blocker 20. In another embodiment, the limiter-heating branch 24 can be electrically coupled in parallel to the quench heater assembly 16. The limiter-heating branch 24 comprises the limiter heater 22, limiter diode blocker 26, and a resistor 28 electrically connected in series. In certain embodiments, the limiter diode blocker 26 can be back-to-back in series connected Zener diodes or a Metal Oxide Semiconductor Field Effect Transistor (MOSFET), and has a limiter threshold voltage ($V_1$). In the illustrated embodiment, the limiter-heating branch 24 comprises a resistor 28 in series connection with the limiter heater 22 and the limiter voltage blocker 26 for adjusting a limiter current ($i_1$) flowing through the limiter heater 22.

In one embodiment, the limiter threshold voltage ($V_1$) of the limiter voltage blocker 26 is larger than the quench threshold voltage ($V_0$) of the quench voltage blocker 20. During a quench event of the coils 12, the quench voltage ($V_q$) across the coils 12 reaches the quench threshold voltage ($V_0$) of the voltage blocker 20, and the heater current ($i_h$) flows through the quench heater assembly 16. The quench heater assembly 16 heats up and starts to transmit heat to the heater regions on the coils 12. When the quench voltage ($V_q$) across the coils 12 exceeds the limiter threshold voltage ($V_1$) of the limiter voltage blocker 26, a limiter current ($i_1$) flows through the limiter heater 22 which heats the superconducting current limiter 18. Accordingly, the superconducting current limiter 18 turns from the superconducting state to the normal state, after the quench heater assembly 16 has normalized the coils 12 and before the heater current ($i_h$) reaches the critical current ($i_0$).

Figure 3:
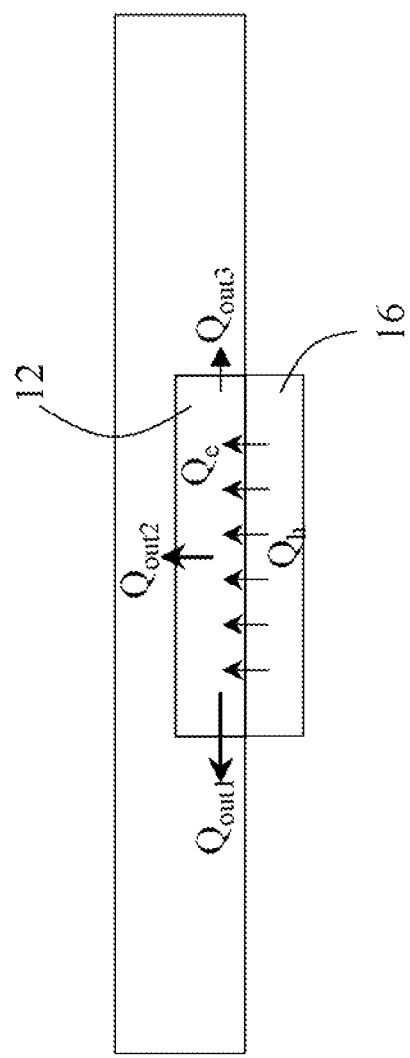
FIG. 3 is a schematic view illustrating determination of a minimum heat generated by the quench heater assembly for normalizing the coils according to one embodiment.

In certain embodiments, a thermal analysis of the quench heater assembly 16 is conducted to ensure that the superconducting current limiter 18 is turned to the normal state after the quench heater 18 has normalized the coils 12. In one example of a magnet 10, a minimum heat (Q) generated by the quench heater assembly 16 for normalizing the coils 12 during a quench event can be determined by simulation or experimental results. Referring to FIG. 3, the minimum heat ($Q_h$) generated by the quench heater system 16 for normalizing the coils 12 can be calculated according to equations:

$$Q_h = \int_0^{t_m} i_h^2 R dt > Q_e + Q_{out};$$

and $$|Q_e| = \int_{T_0}^{T_c} cm dT$$

wherein "$Q_e$" represents the heat enthalpy increase of the superconductor of the coil 12 at the heater region when the superconductor temperature increases from the low working temperature ($T_0$) (for example 4.2K at liquid helium) to its critical temperature $T_c$ (for example 9.8K for NbTi superconductor); "$Q_{out}$" is the heat flows from the superconductor at the heater region to the farthest superconductors, shown as $Q_{out1}$, $Q_{out2}$, and $Q_{out3}$ in FIG. 3; "$i_h$" is the heater current flowing through the quench heater assembly 16; "R" is the resistance of the quench heater assembly 16; "$t_m$" is the minimum time for normalizing the coils 12 after a quench occurs to one or more of the coils 12; "c" is the specific heat of the superconductor; and "m" the mass of the superconductor. Accordingly, a minimum time ($t_m$) and heater current ($i_{hm}$) are established for normalizing the superconducting coils 12, for example, by observing the current curve C3 in FIG. 2. In one embodiment, the superconducting current limiter 18 is turned to the normal state at a time point that lies between the minimum time ($t_m$) when the coils 12 have been normalized and the critical time ($t_0$) when the heater current reaches the critical current. In another embodiment, the superconducting current limiter 18 is turned to the normal state when the heater current ($i_h$) is between the minimum heater current ($i_{hm}$) and the current limit ($i_{limit}$).

In another embodiment, the limiter threshold voltage ($V_1$) of the limiter voltage blocker 26 is substantially the same as the quench threshold voltage ($V_0$) of the quench voltage blocker 20. Once a quench occurs to one or more of the coils 12, and the quench voltage exceeds the ($V_1$) and ($V_0$), the quench voltage will gradually drive electric currents flowing through both the quench heater assembly 16 and the limiter heater 22. The limiter heater 22 turns the superconducting current limiter 18 into the normal state when the quench heater assembly 16 has normalized the coils 12 and before the heater current reaches to the current limit. In this embodiment, the limiter current increases much more slowly than the heater current.

Figure 4:
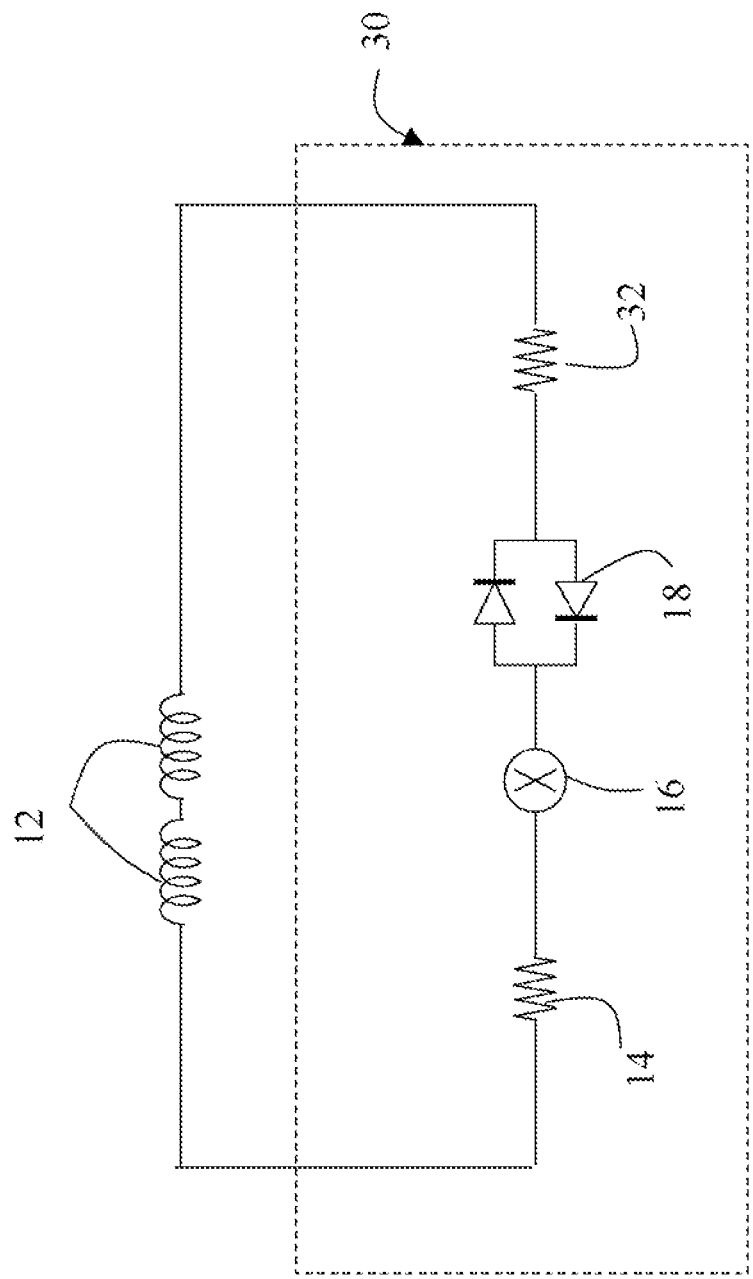
FIG. 4 is a circuit diagram of a superconducting magnet comprising a quench protection circuit according to another embodiment of the invention.

Referring to FIG. 4, a quench protection circuit 30 for providing quench protection of coils 12 according to another embodiment is illustrated. In this embodiment, a limiter heater 32 is thermally coupled to the superconducting current limiter 18 and is electrically connected in series with the voltage blocker 20 and the quench heater assembly 16. During a quench event, the quench voltage exceeds the threshold voltage $V_0$ of the diode blocker 20, and a heater current ($i_{h2}$) flows through both the quench heater assembly 16 and the limiter heater 32. In certain embodiments, heat generated by the limiter heater 32 turns the superconducting current limiter 18 into the normal state when the quench heater assembly 16 has normalized the coils 12, and before the heater current reaches to the limiting current of the quench heater assembly 16. In one embodiment, this is obtained by selecting proper resistance values of the quench heater assembly 16 and the limiter heater 32.

Figure 5:
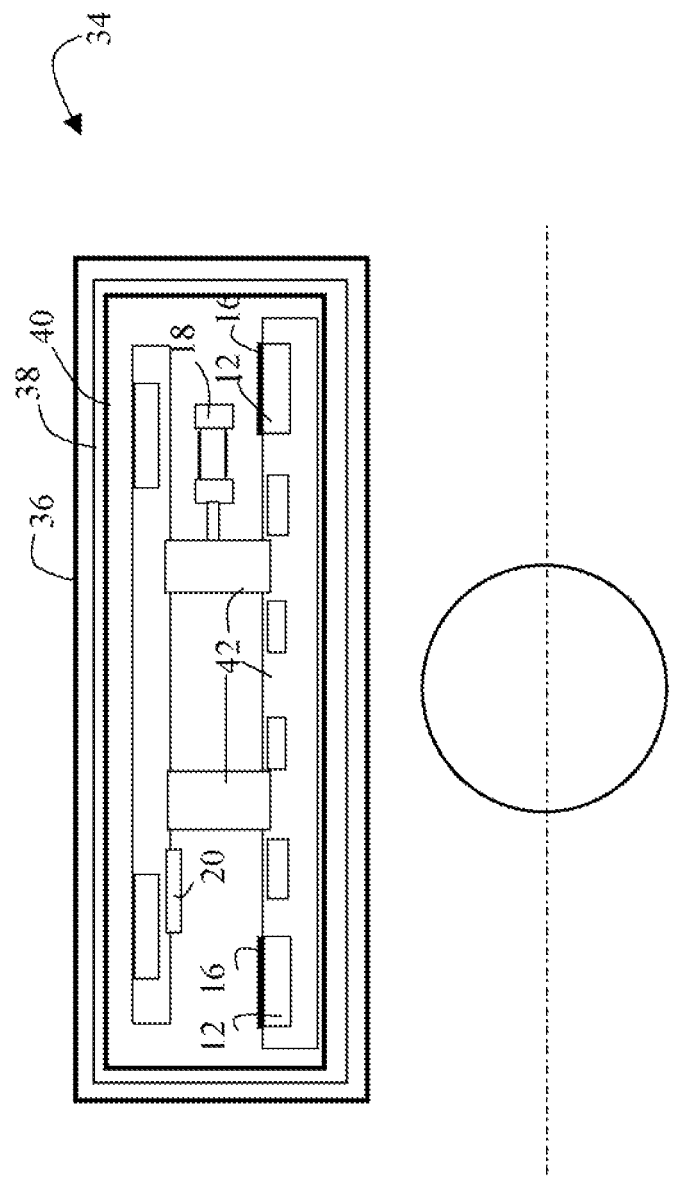
FIG. 5 illustrates a simplified cross-sectional view of a superconducting magnet system utilizing the quench protection circuit according to one embodiment.

Referring to FIG. 5, the quench protection circuit 14, 30 illustrated in FIG. 1 or 4 is used in a superconducting magnet system 34 ("system 34") includes at least one superconducting coil 12, a thermal shield 38 and a vacuum vessel 36, and a quench protection circuit 14, or 30 for providing quench protection for the coils 12. The quench protection circuit 14, or 30 comprises at least series connected quench heater assembly 16, superconducting current limiter 18 and voltage blocker 20 as illustrated in FIGS. 1 and 4. In certain embodiments, the quench protection circuit 14, or 30 comprises a plurality of quench heater assembly 16 thermally coupled to the coils 12. In the illustrated embodiment, the quench heaters in the assembly 16 are each a thermally conductive film attached on an outer or inner surface of the corresponding coil 12 or even embedded between two layers of the winding of superconducting coil 12. Once a quench occurs to one or more of the coils 12, the quench heater assembly 16 heats up and spreads heat to the heater regions on the coils 12 to normalize the coils 12 at that region. The normalized portions of the coils 12 have resistances and generate joule heating that further propagate within the coils 12 and gradually transit the magnetic energy into thermal energy, reduce the maximum temperature and voltage within the quenched coil. The superconducting current limiter 18 protects the quench heater assembly 16 from overcurrent. In the illustrated embodiment, the superconducting current limiter 18 is arranged within the vacuum vessel 36 and the thermal shield 38. Accordingly, no additional wiring is required that penetrates the vacuum vessel 36 for electrically coupling the superconducting current limiter 18 with the quench heater assembly 16. In the illustrated embodiment of FIG. 5, the voltage blocker 20 is also arranged within the vacuum vessel 36 and the thermal shield 38. In other embodiments, the voltage blocker 20 may be arranged outside of the vacuum vessel 36.

In the illustrate embodiment, the system 34 comprises a thermal shield 38 disposed within the vacuum vessel 36. The thermal shield 38 prevents radiation heat of the room temperature from affecting the coils 12. In the illustrated embodiment, the system further comprises a cryogen tank 40 within the thermal shield 38. The cryogen tank 40 receives the coils 12 and stores cryogen such as liquid helium. In the illustrated embodiment, the coils 12 are immersed in the liquid helium, and are maintained at the low temperature of the liquid helium during normal operation of the system 34. In the illustrated embodiment, the system 34 comprises a plurality of supporting members 42 for supporting the coils 12. In the illustrated embodiment, the superconducting current limiter 18 is immersed in the liquid helium. In the illustrated embodiment, the superconducting current limiter 18 is mounted to the supporting member 42. In other embodiments, the superconducting current limiter 18 can be mounted to the coils 12, or mounted to an inner surface of the cryogen tank 40. In the illustrated embodiment, the voltage blocker 20 is also arranged within the cryogen tank 40. In the illustrated embodiment, the voltage blocker 20 is mounted on the supporting member 42.

Figure 6:
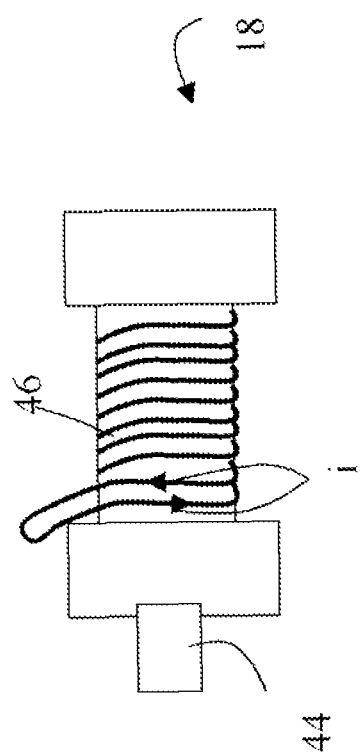
FIG. 6 illustrates an exemplary perspective view of a superconducting current limiter according to one embodiment.

Referring to FIG. 6, in one embodiment, the superconducting current limiter 18 comprises a bobbin 44 and at least one superconducting wire 46 wound on the bobbin 44. In one embodiment, the at least one superconducting wire 46 is bifilarly wound on the bobbin 44, and current (i) following through adjacent winding turns are in opposite directions that the magnetic field generated by adjacent turns cancels each other therefore the net inductance of the superconducting current limiter is substantially zero. In the illustrated embodiment, the superconducting wire 46 is folded and then the folded wire is spirally wound on the bobbin 44 as a solenoid. In certain embodiments, the bobbin 44 comprises Fiberglass Reinforced Plastics (FRP), or metals such as copper and aluminum), and is adapted for mounting the superconducting current limiter 18 in the system 30 (FIG. 5). In certain embodiments, the superconducting wire 46 comprises superconducting material, preferably to be Niobium-Titanium (NbTi) wire with Copper-Nickel (Cu—Ni) matrix.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A superconducting magnet, comprising:
at least one superconducting coil; and
a quench protection circuit electrically coupled to said at least one coil in parallel, the circuit comprising:
  at least one quench heater assembly thermally coupled to the at least one coil;
  at least one superconducting current limiter electrically connected in series with the at least one quench heater assembly, wherein the superconducting current limiter has a superconducting state with zero resistance, and a normal state with a normal resistance to decrease an electric current flowing through the quench heater assembly; and
  a limiter heating branch electrically coupled in parallel with the quench protection circuit.

2. The magnet of claim 1, wherein the quench protection circuit further comprises at least one voltage blocker electrically connected in series to the quench heater assembly.

3. The magnet of claim, wherein the quench protection circuit further comprises a limiter heater thermally coupled to the superconducting current limiter configured to change the superconducting current limiter from the superconducting state to the normal state.

4. The magnet of claim 3, wherein the quench protection circuit comprises a main heating branch comprising the quench heater assembly, the limiter heater and a voltage blocker electrically connected in series to the limiter heater.

5. The magnet of claim 3, wherein the limiter heater is electrically connected in series to the quench heater and the superconducting current limiter.

6. The magnet of claim 3, where in the quench heater assembly comprises a plurality of quench heaters connected in parallel or in series.

7. A superconducting magnet system comprising:
a thermal shield;
at least one superconducting coil in the thermal shield;
a vacuum vessel enclosing the thermal shield; and
a quench protection circuit electrically coupled to said at least one superconducting coil in parallel, the circuit comprising:
  at least one quench heater thermally coupled to the at least one superconducting coil;
  at least one superconducting current limiter connected in series with the at least one quench heater assembly, the at least current limiter comprising a superconducting state with zero resistance and normal state with it finite resistance; and a limiter heating branch electrically coupled in parallel with the quench protection circuit.

8. The system of claim 7, wherein the quench protection circuit further comprises at least one voltage blocker electrically connected in series to the quench heater.

9. The system of claim 7, wherein the superconducting current limiter is located inside the thermal shield.

10. The system of claim 9 further comprising a cryogen tank storing, a cryogen, and wherein the at least one superconducting coil is immersed in the cryogen.

11. The system of claim 10, wherein the superconducting current limiter of the quench protection circuit is located inside the cryogen tank.

12. The system of claim 11, wherein the superconducting current limiter comprises a bobbin, and at least one superconducting wire bifilarly wound on the bobbin.

13. The system of claim 11 further comprising at least one supporting member in the cryogen tank for supporting the at least one superconducting coil, and wherein the superconducting current limiter is mounted to the supporting member.

14. The system of claim 12, wherein the superconducting wire comprises a Niobium-Titanium superconducting material with a Copper-Nickel (Cu—Ni) matrix.

15. A method for quenching superconducting coils, comprising:

coupling a quench protection circuit in parallel to at least one superconducting coil, wherein said quench protection circuit comprises at least one quench heater assembly and at least one superconducting current limiter;

coupling a limiter heating branch electrically coupled in parallel with the quench protection circuit;

triggering a quench event caused by an increasing quench voltage across the at least one superconducting coil;

powering the quench heater and limiter heater upon said quench event and normalizing the at least one superconducting coil at heater regions; and turning the superconducting current limiter from a superconducting state to a normal state to increase the resistance of the quench protection circuit heater branch and limit the current of quench heater assembly to be less than its maximum allowable current.

16. The method of claim 15, wherein turning the superconducting current limiter from the superconducting sate to the normal state comprises powering a limiter heater by the quench voltage which is thermally coupled to the superconducting current limiter.

17. The magnet of claim 1, wherein the limiter-heating branch comprises:
a limiter heater;
a limiter diode blocker; and
a resistor, electrically connected in series.

* * * * *

UNITED STATES PATENT AND TRADEMARK OFFICE
CERTIFICATE OF CORRECTION

| | | |
|---|---|---|
| PATENT NO. | : 8,583,201 B2 | Page 1 of 1 |
| APPLICATION NO. | : 13/237805 | |
| DATED | : November 12, 2013 | |
| INVENTOR(S) | : Anbo Wu et al. | |

It is certified that error appears in the above-identified patent and that said Letters Patent is hereby corrected as shown below:

In the Specifications:

In Column 3, Line 59, delete "in- parellel," and insert -- in- parallel, --, therefor.

In Column 5, Line 56, delete "heater 18" and insert -- heater 16 --, therefor.

In Column 8, Line 2, delete "thereof" and insert -- thereof. --, therefor.

In the Claims:

In Column 8, Line 54, in Claim 6, delete "where in" and insert -- wherein --, therefor.

In Column 9, Line 2, in Claim 7, delete "with it" and insert -- with a --, therefor.

In Column 9, Line 12, in Claim 10, delete "storing," and insert -- storing --, therefor.

Signed and Sealed this
Fourth Day of February, 2014

Michelle K. Lee
*Deputy Director of the United States Patent and Trademark Office*